(12) United States Patent
Axelrod et al.

(10) Patent No.: US 10,376,038 B2
(45) Date of Patent: Aug. 13, 2019

(54) ADJUSTABLE BRUSH

(71) Applicant: FOUR PAWS PRODUCTS, LTD, Neptune City, NJ (US)

(72) Inventors: Glen S. Axelrod, Colts Neck, NJ (US); Ajay Gajria, Maharashtra (IN); Mary Louise Fetter, Ocean, NJ (US)

(73) Assignee: FOUR PAWS PRODUCTS, LTD., Neptune City, NJ (US)

( * ) Notice: Subject to any disclaimer, the term of this patent is extended or adjusted under 35 U.S.C. 154(b) by 305 days.

(21) Appl. No.: 15/471,106

(22) Filed: Mar. 28, 2017

(65) Prior Publication Data
US 2018/0279756 A1 Oct. 4, 2018

(51) Int. Cl.
| | | |
|---|---|---|
| *A01K 13/00* | (2006.01) | |
| *A46B 7/02* | (2006.01) | |
| *A46B 5/00* | (2006.01) | |
| *A46B 7/08* | (2006.01) | |

(52) U.S. Cl.
CPC .............. *A46B 7/02* (2013.01); *A01K 13/002* (2013.01); *A46B 5/0095* (2013.01); *A46B 7/08* (2013.01); *A46B 2200/1093* (2013.01)

(58) Field of Classification Search
CPC .......... A01K 13/002; A46B 7/02; A46B 7/08; A46B 7/06; A46B 2200/1093; A46B 5/0095
See application file for complete search history.

(56) References Cited

U.S. PATENT DOCUMENTS

| | | | |
|---|---|---|---|
| 3,893,424 A | | 7/1975 | Casler |
| 5,339,840 A | * | 8/1994 | Koppel ................ A01K 13/002 119/625 |
| 6,955,137 B2 | | 10/2005 | Dunn et al. |
| 2004/0045569 A1 | * | 3/2004 | Chan ..................... A45D 20/48 132/118 |

(Continued)

FOREIGN PATENT DOCUMENTS

GB 2532519 5/2016

OTHER PUBLICATIONS

"Grooming Brush", Website Available on May 15, 2015. Retrieved on May 17, 2018. Cited on the International Search Report.

(Continued)

*Primary Examiner* — Magdalena Topolski
(74) *Attorney, Agent, or Firm* — Grossman, Tucker, Perreault & Pfleger, PLLC

(57) ABSTRACT

An example adjustable brush may include a handle and a brush head coupled to the handle. The brush head may include a platform, a first arm extending from the platform, and a second arm extending from the platform. A non-rotatable shaft may extend between the first and second arms and a rotatable shaft may be positioned between the non-rotatable shaft and the platform. The rotatable shaft may extend between the first and second arms. A plurality of adjustable teeth may be slideably coupled to the non-rotatable shaft and a plurality of spacers may be positioned on the rotatable shaft. At least a portion of one or more of the plurality of spacers may engage at least a portion of a respective one or more of the adjustable teeth. A rotation of the rotatable shaft rotates the spacers and causes a lateral movement of the adjustable teeth along the non-rotatable shaft.

20 Claims, 5 Drawing Sheets

(56) References Cited

U.S. PATENT DOCUMENTS

| | | | |
|---|---|---|---|
| 2004/0250831 A1* | 12/2004 | Rizzuto | A45D 2/002 132/271 |
| 2007/0193529 A1* | 8/2007 | Vandervoet | A01K 13/002 119/617 |
| 2012/0304938 A1 | 12/2012 | Wang | |
| 2013/0125829 A1* | 5/2013 | Wang | A01K 13/002 119/611 |
| 2014/0026821 A1* | 1/2014 | Tu | A01K 13/002 119/600 |
| 2014/0026822 A1 | 1/2014 | Harris, II | |
| 2014/0238310 A1 | 8/2014 | Holt, Jr. | |

OTHER PUBLICATIONS

International Search Report and Written Opinion from related PCT Appln. No. PCT/US2018/024440, dated Jun. 18, 2018.

* cited by examiner

_US 10,376,038 B2_

ADJUSTABLE BRUSH

TECHNICAL FIELD

The present disclosure is generally related to brushes and more particularly to brushes having adjustable teeth spacing.

BACKGROUND INFORMATION

Grooming brushes may be used with domesticated animals (e.g., dogs, cats, horses, or the like). A grooming brush may be used to remove and/or prevent the animal's fur/hair from developing tangles or knots. In addition, a grooming brush may reduce the amount of fur/hair that the animal sheds and/or hasten the rate at which the fur/hair is removed from the body of the animal. For example, the grooming brush may remove fur/hair from the animal prior to the fur/hair naturally falling from the animal and collecting on a surface (e.g., a floor of a house or furniture). Therefore, a grooming brush may yield benefits to both the owner of the animal and the animal itself.

Grooming brushes may include a handle and one or more protrusions (e.g., bristles) that extend from a portion of the grooming brush. The effectiveness of the grooming brush may be a result of the material forming the protrusions, the spacing between each of the protrusions, and/or one or more characteristics of the fur/hair being groomed (e.g., length of the fur/hair, thickness of the coat formed by the fur/hair, and/or the wiriness of the fur/hair). As a result, a grooming brush that is effective in grooming a first animal may not be effective in grooming a second animal. Furthermore, while a grooming brush may be effective in grooming a specific animal, the effectiveness may not be maximized because the grooming brush is not able to be adjusted to suit the unique characteristics of the specific animal's fur/hair. For example, if the spacing between the protrusions is too wide or too narrow, the grooming brush may not function properly and may result in discomfort to the animal being groomed.

SUMMARY

An example of an adjustable brush may include a handle and a brush head coupled to the handle. The brush head may include a platform, a first arm extending from the platform, and a second arm extending from the platform. The brush head may also include a non-rotatable shaft extending between the first and second arms and a rotatable shaft positioned between the non-rotatable shaft and the platform. The rotatable shaft may also extend between the first and second arms. A plurality of adjustable teeth may be slideably coupled to the non-rotatable shaft and a plurality of spacers may be positioned on the rotatable shaft. At least a portion of one or more of the plurality of spacers may engage at least a portion of a respective one or more of the adjustable teeth. A rotation of the rotatable shaft may cause a rotation of the spacers and a lateral movement of the adjustable teeth along the non-rotatable shaft.

An example of a brush head may include a platform, a first arm extending from the platform, and a second arm extending from the platform. The brush head may also include a non-rotatable shaft extending between the first and second arms and a rotatable shaft positioned between the non-rotatable shaft and the platform. The rotatable shaft may also extend between the first and second arms. A plurality of adjustable teeth may be slideably coupled to the non-rotatable shaft and a plurality of spacers may be positioned on the rotatable shaft. At least a portion of one or more of the plurality of spacers may engage at least a portion of a respective one or more of the adjustable teeth. A rotation of the rotatable shaft may cause a rotation of the spacers and a lateral movement of the adjustable teeth along the non-rotatable shaft.

Another example of a brush head may include a housing having a first arm and a second arm. A non-rotatable shaft and a rotatable shaft may extend between the first and second arms. A plurality of adjustable teeth may be slideably coupled to the non-rotatable shaft and a plurality of spacers may be positioned on the rotatable shaft. At least a portion of one or more of the plurality of spacers may engage at least a portion of a respective one or more of the adjustable teeth. Rotation of the rotatable shaft may cause a rotation of the spacers and a lateral movement of the adjustable teeth along the non-rotatable shaft.

BRIEF DESCRIPTION OF THE DRAWINGS

These and other features and advantages will be better understood by reading the following detailed description, taken together with the drawings, wherein.

DETAILED DESCRIPTION OF PREFERRED EMBODIMENTS

Figure 1:
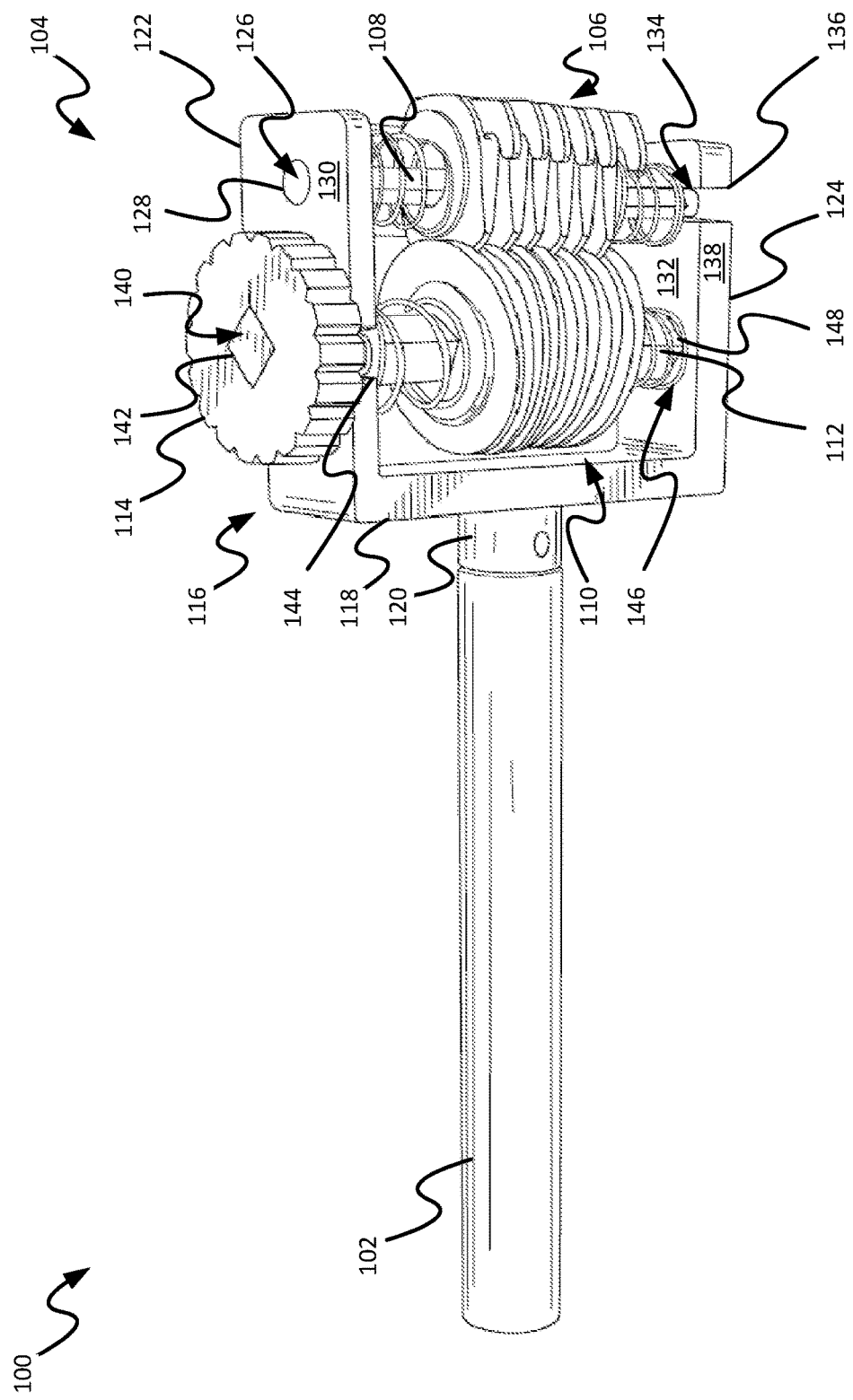
FIG. 1 is a perspective view of an adjustable brush consistent with embodiments of the present disclosure.

As shown in FIG. 1, an adjustable brush 100 includes a handle 102 coupled to a brush head 104. The brush head 104 includes a plurality of adjustable teeth 106 slideably coupled to a non-rotatable shaft 108. The adjustable teeth 106 slide along the non-rotatable shaft 108 in response to a rotation of a plurality of spacers 110. Each of the plurality of spacers 110 may be positioned on a rotatable shaft 112 such that a rotation of the rotatable shaft 112 results in a rotation of the spacers 110. That is, the spacers 110 preferably do not independently rotate relative to the rotatable shaft 112. An adjustment knob 114 may be coupled to an end of the rotatable shaft 112 such that a rotation of the adjustment knob 114 results in a rotation of the rotatable shaft 112.

As shown, the brush head 104 may include a housing 116 having a platform 118 coupled to the handle 102. The handle 102 may be coupled to the platform 118 such that the handle 102 is equidistant from opposing sides of the platform 118. In other words, the handle 102 may be positioned at a midpoint of the platform 118. In some instances, the platform 118 may include a protrusion 120 that extends from the platform 118 and in a direction of the handle 102. The protrusion 120 may be coupled to the handle 102. Regardless of how or where the platform 118 is coupled to the handle 102, the platform 118 may be coupled to the handle 102 using any one or more of a press-fit, a snap-fit, an adhesive, a mechanical coupling (e.g., a screw, a pin, a bolt, or the like), and/or any other suitable form of coupling. In some instances, the handle 102 may be threadably coupled to the platform 118 and this may allow for the handle 102 and/or the brush head 104 to be interchangeable.

As shown, the platform 118 may be a span of material from which a first arm 122 and/or a second arm 124 may extend. In some instances, platform 118 may be planar or non-planar. For example, the platform 118 may include one or more arcuate portions from which the first and/or second arm 122 and 124 may extend.

The housing 116 may also include the first arm 122 and the second arm 124. As shown, the first and second arms 122 and 124 may extend from the platform 118 in a direction away from the handle 102. The first and second arms 122 and 124 may extend from opposing distal ends of the platform 118 and the handle 102 may be equidistant from each of the first and second arms 122 and 124. In some instances, the first and second arms 122 and 124 may be parallel to each other. For example, each of the first and second arms 122 and 124 may be perpendicular with the platform 118. Additionally (or alternatively), the first and second arms 122 and 124 may extend from the platform 118 in a direction parallel to the handle 102.

In some instances, the first and second arms 122 and 124 may not extend for the platform 118. For example, the first and second arms 122 and 124 may extend from a portion of the handle 102. In these instances, the housing 116 may not include the platform 118.

As shown, the non-rotatable shaft 108 may extend between the first and second arms 122 and 124. A first distal end 126 of the non-rotatable shaft 108 may be received within an opening 128 that extends at least partially through the first arm 122. In other words, the opening 128 may extend from an inner surface 132 of the housing 116 towards an outer surface 130 of the housing 116 and at least partially through the first arm 122. A second distal end 134 of the non-rotatable shaft 108 may be received within a groove 136 having an open end, wherein the groove 136 extends at least partially through the second arm 124. In other words, the groove 136 extends from a bottom surface 138 of the housing 116 partially through the second arm 124 and from the inner surface 132 of the housing 116 towards the outer surface 130 of the housing 116 and at least partially through the second arm 124.

To prevent the rotation of the non-rotatable shaft 108, the non-rotatable shaft 108 may be coupled to the housing at the opening 128 and/or the groove 136 using any one or more of a press-fit, a snap-fit, an adhesive, a mechanical coupling (e.g., a screw, a pin, a bolt, or the like), and/or any other suitable form of coupling. In some instances, the first distal end 126 and/or the second distal end 134 may have a non-circular cross-section that corresponds to a respective non-circular cross-section of the opening 128 and/or the groove 136. In other words, the portions of the non-rotatable shaft 108 received within the opening 128 and/or the groove 136 may have a non-circular shape that corresponds to the non-circular shape of the opening 128 and/or groove 136. As such, the rotation of the non-rotatable shaft 108 may be substantially prevented.

A first distal end 140 of the rotatable shaft 112 may be received within an opening 142 extending at least partially through the adjustment knob 114. The first distal end 140 may be coupled to the adjustment knob 114 such that a rotation of the adjustment knob 114 results in a rotation of the rotatable shaft 112. The first distal end 140 of the rotatable shaft 112 may be coupled to the adjustment knob 114 using any one or more of a press-fit, a snap-fit, an adhesive, a mechanical coupling (e.g., a screw, a pin, a bolt, or the like), and/or any other suitable form of coupling. In some instances, the opening 142 and the first distal end 140 of the rotatable shaft 112 may each have a corresponding non-circular cross-section.

As shown, the rotatable shaft 112 may extend between the first and second arms 122 and 124 and may be positioned between the non-rotatable shaft 108 and the platform 118. A portion of the rotatable shaft 112 may be received within a groove 144 in the first arm 122. As shown, the groove 144 has an open end and may extend at least partially through the first arm 122. In other words, the groove 144 extends from the bottom surface 138 of the housing 116 partially though the first arm 122 and from the inner surface 132 of the housing 116 towards the outer surface 130 of the housing 116 and at least partially through the first arm 122. The portion of the rotatable shaft 112 that is received within the groove 144 may have a circular cross-section that generally corresponds to a portion of the groove 144. As such, the portion of the rotatable shaft 112 that is received within the groove 144 is capable of rotation within the groove 144.

A second distal end 146 of the rotatable shaft 112 may be received within an opening 148 that extends at least partially through the second arm 124. In other words, the opening 148 extends from the inner surface 132 of the housing 116 towards the outer surface 130 of the housing 116 and at least partially through the second arm 124. The second distal end 146 and the opening 148 may each have a circular cross-section such that the portion of the rotatable shaft 112 received within the opening 148 is capable of rotation within the opening 148.

Figure 2:
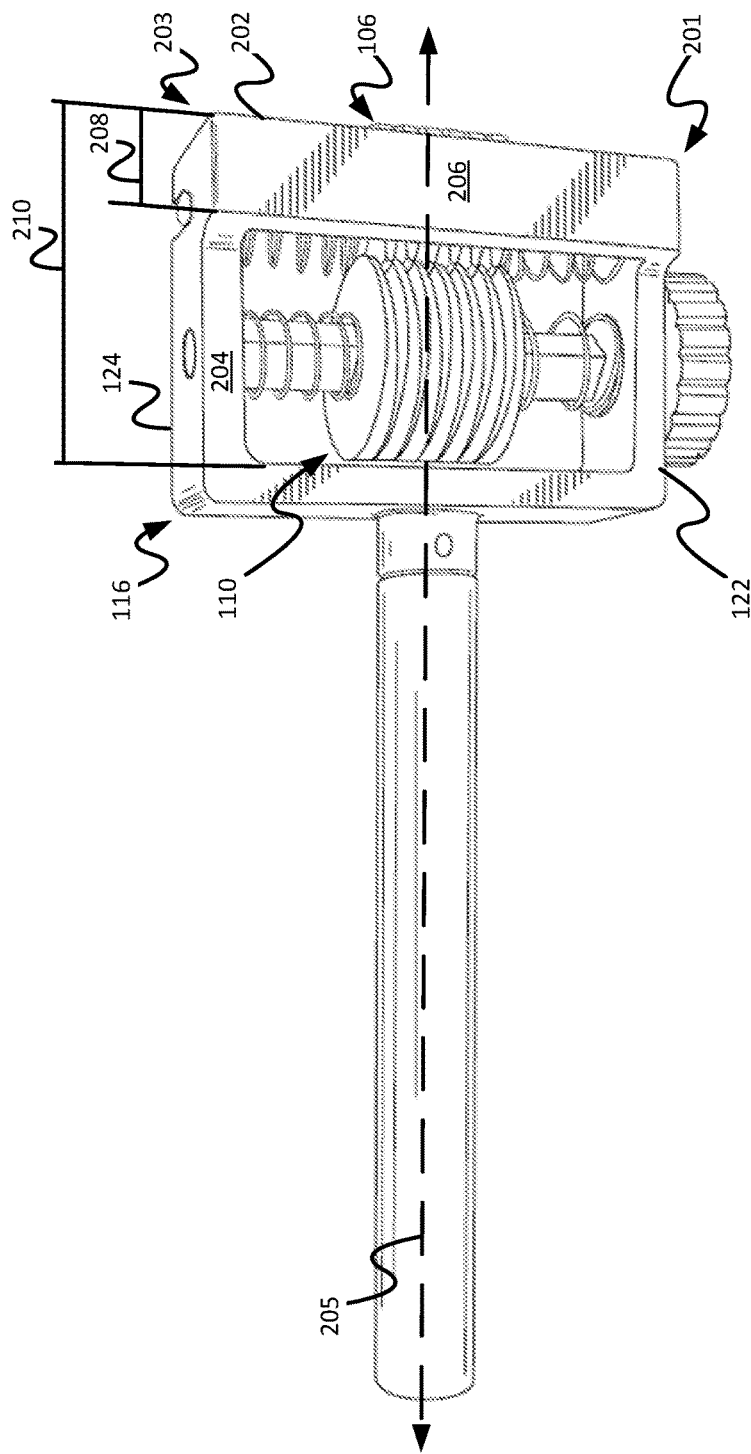
FIG. 2 is another perspective view of the adjustable brush of FIG. 1, consistent with embodiments of the present disclosure.

As shown in FIG. 2, a support 202 may extend from the first arm 122 to the second arm 124 and may extend longitudinally from distal ends 201 and 203 of the first and second arms 122 and 124 along a longitudinal axis 205 towards the spacers 110. The support 202 may be positioned at or adjacent the distal ends 201 and 203 of the first and second arms 122 and 124 such that the support 202 at least partially obscures (e.g., covers) the adjustable teeth 106. Additionally (or alternatively), the support 202 may be positioned such that spacers 110 are not obscured (e.g., covered) by the support 202. In some instances, the support 202 may be generally described as extending from the first arm 122 to the second arm 124 and as extending longitudinally between the distal ends 201 and 203 of the first and second arms 122 and 124 and at least a portion of the spacers 110.

In some instances, the spacers 110 may extend beyond a top surface 204 of the housing 116 and remain below a top surface 206 of the support 202 (i.e., the spacers 110 do not extend beyond the top surface 206 of the support 202). In other instances, a portion of the spacers 110 may extend beyond the top surface 206 of the support 202. When at least a portion of the spacers 110 extend beyond a top surface 204 of the housing 116, a cover may be provided that at least partially encloses the portion of the spacers 110 extending beyond the top surface 204 of the housing 116. However, in some instances, the spacers 110 may not extend beyond the top surface 204 of the housing 116. In these instances, the support 202 may extend over at least a portion of the spacers 110 such that the support 202 obscures (e.g., covers) at least a portion of the spacers 110.

The support 202 may have a support width 208 that measures less than an arm length 210. For example, in some instances, a ratio of a measure of the support width 208 to a measure of the arm length 210 (i.e., (measure of support width 208)/(measure of arm length 210)) may be in a range of 0.1 to 0.75. By way of further example, a ratio of a measure of the support width 208 to a measure of the arm length 210 may be in a range of 0.2 to 0.4. By way of even further example, a ratio of a measure of the support width 208 to a measure of the arm length 210 may be in a range of 0.25 and 0.35. By way of further example, a ratio of a measure of the support width 208 to a measure of the arm length 210 may be 0.28.

In some instances, the support width 208 may measure, for example, in a range of 5 millimeters (mm) to 20 mm and the arm length 210 may measure in a range of 20 mm to 60 mm. By way of further example, the support width 208 may measure in a range of 7 mm to 18 mm and the arm length 210 may measure in a range of 30 mm to 50 mm. By way of even further example, the support width 208 may measure in a range of 10 mm to 14 mm and the arm length 210 may measure in range of 40 mm to 46 mm. By way of further example, the support width 208 may measure 12.6 mm and the arm length 210 may measure 44.3 mm.

Figure 3:
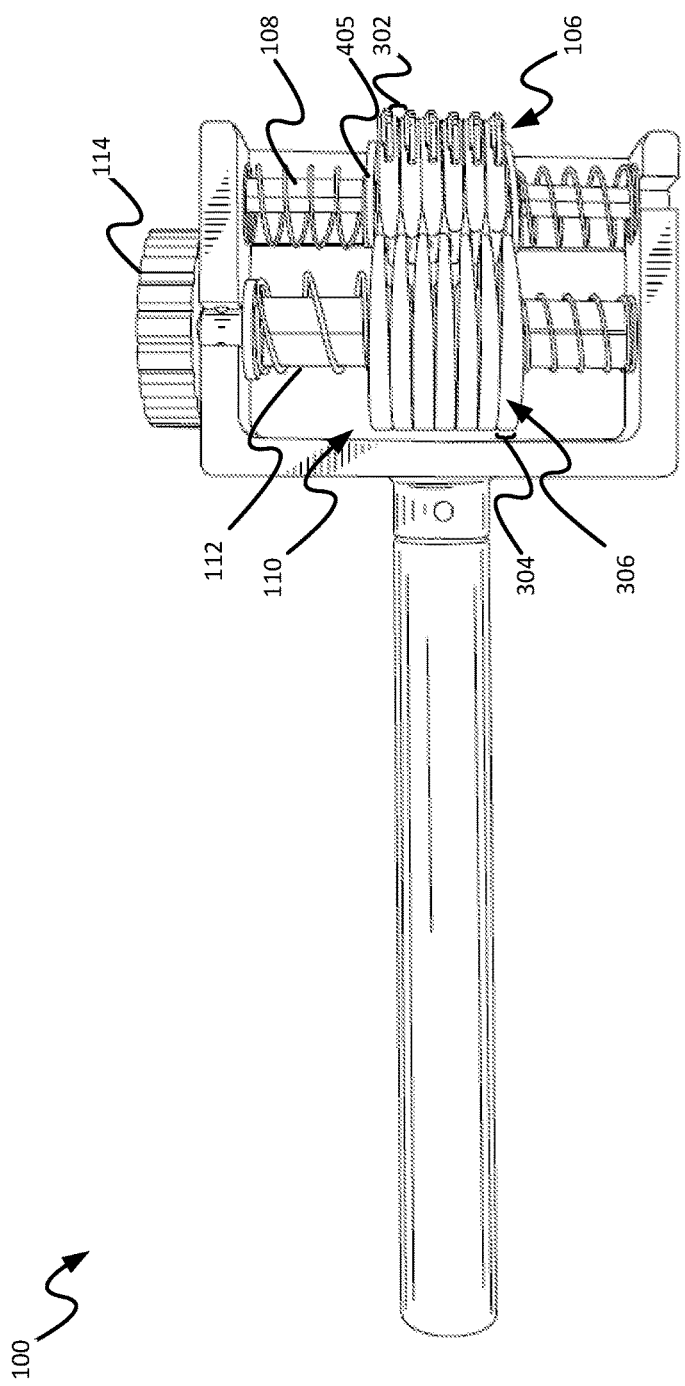
FIG. 3 is a perspective view of the adjustable brush of FIG. 1 having a minimum separation distance between a plurality of adjustable teeth, consistent with embodiments of the present disclosure.
Figure 4:
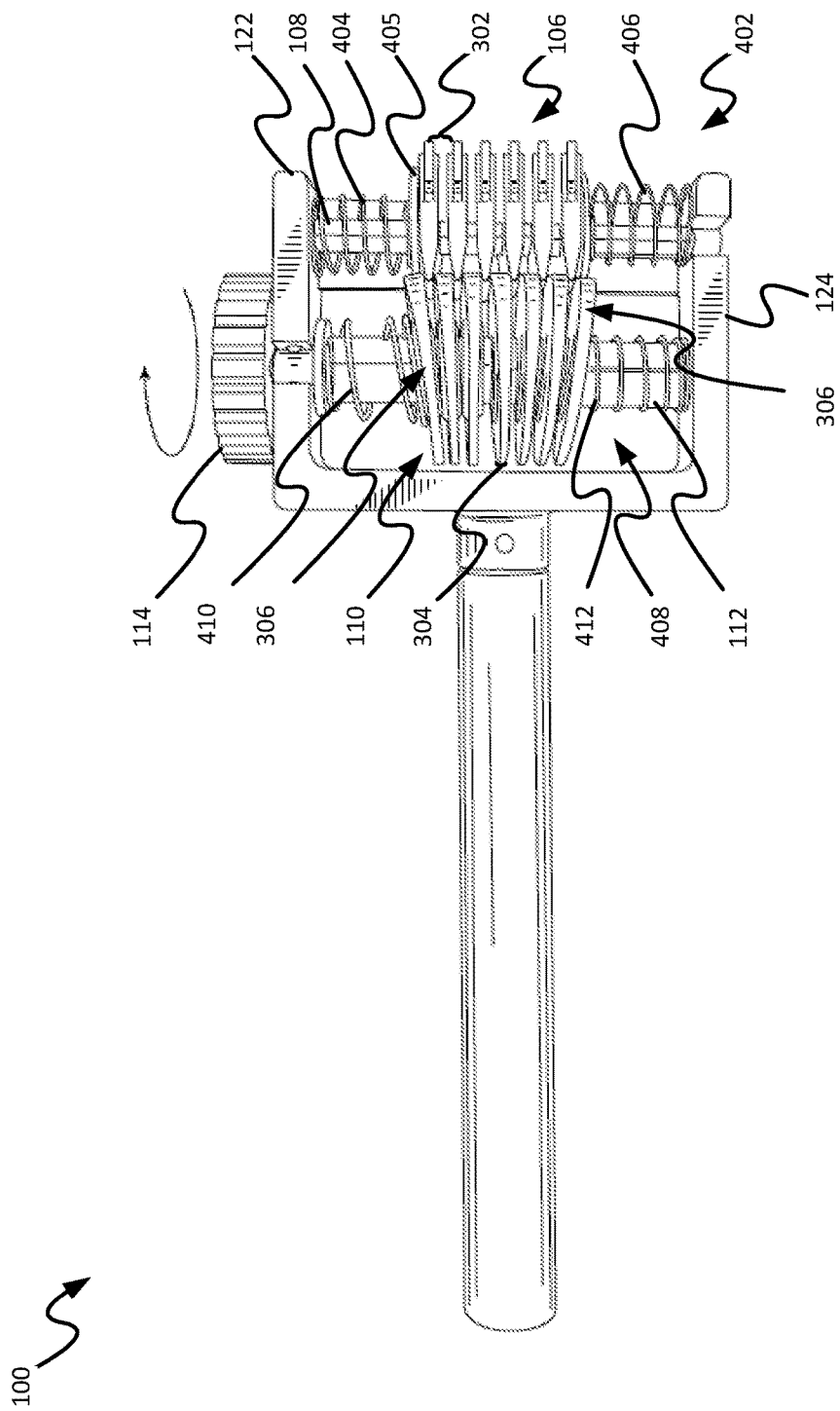
FIG. 4 is a perspective view of the adjustable brush of FIG. 1 having adjustable teeth separated by a predetermined distance that is greater than a minimum separation distance, consistent with embodiments of the present disclosure.

FIG. 3 shows the adjustable brush 100, wherein a separation distance 302 between the adjustable teeth 106 is at a minimum value. As shown in FIG. 4, as the adjustment knob 114 is rotated the separation distance 302 may begin to increase until reaching a maximum value. Continued rotation of the adjustment knob 114 after reaching the maximum value may result in the separation distance 302 decreasing (e.g., until reaching the minimum value as shown in FIG. 3). In some instances, when the adjustment knob 114 is rotated through one full rotation, the rate at which the separation distance 302 increases may vary from the rate at which the separation distance 302 decreases. In other words, there may be a fine adjustment region and a coarse adjustment region through which the adjustment knob 114 is rotated. Alternatively, when the separation distance 302 reaches the maximum value (or the minimum value), continued rotation in the same direction may be prevented.

As shown, at least a portion of one or more spacers 110 engages (e.g., contacts) at least a portion of a respective one or more adjustable teeth 106. For example, in some instances, each adjustable tooth 106 may be positioned between two spacers 110. By way of further example, in other instances, each spacer 110 may be positioned between two adjustable teeth 106. Regardless, as the adjustment knob 114 is rotated, the rotatable shaft 112 and spacers 110 may rotate while the non-rotatable shaft 108 and the adjustable teeth 106 may remain rotatably fixed. Therefore, the portion of each spacer 110 that engages (e.g., contacts) one or more adjustable teeth 106 changes with rotation. Accordingly, varying a thickness 304 of the spacers 110 at least at a perimeter 306 of the spacers 110 may cause the separation distance 302 to change. In other words, the spacers 110 may convert the rotational movement of the rotatable shaft 112 into a lateral (e.g., sliding) movement of the teeth 106 along the non-rotatable shaft 108. As a result, the spacers 110 may be generally described as being and/or including a cam.

For example, as shown, each of the spacers 110 may be disk-shaped, wherein the thickness 304 of each spacer 110 may vary with angular and/or radial position for at least a portion of a respective spacer 110. For example, as the disk-shaped spacer 110 is rotated, the thickness 304 of the portion of the spacer 110 engaging (e.g., contacting) the adjustable teeth 106 may increase from a minimum value to a maximum value and may then decrease from the maximum value (e.g., until returning to the minimum value). As such, in some instances, the disk-shaped spacer 110 may generally be described as being and/or including a disk-shaped cam.

While the spacers 110 are generally shown as being disk-shaped such a configuration is not required. For example, the spacers 110 may be square-shaped, octagonal-shaped, elliptical, and/or any other suitable shape. Further, in some instances one or more of the spacers 110 may have a shape that is different from that of another of the spacers 110.

A maximum value of the thickness 304 may measure, for example, in a range of 1 mm to 5 mm and a minimum value of the thickness 304 may measure, for example, in a range of 0.5 mm to 2 mm. By way of further example, the maximum value of the thickness 304 may measure in a range of 1.5 mm to 4 mm and a minimum value of the thickness 304 may measure in a range of 0.75 mm to 1.5 mm. By way of even further example, the maximum value of the thickness 304 may measure in a range of 1.75 mm to 3.25 mm and a minimum value of the thickness 304 may measure in a range of 0.75 mm to 1.25 mm. By way of further example, a maximum value of the thickness 304 may measure 2.7 mm and a minimum value of the thickness 304 may measure 0.8 mm.

A measure of the change in the separation distance 302 may be equal to a measure of the change in the thickness 304 of the portion of the spacers 110 engaging the adjustable teeth 106. A maximum value of the separation distance 302 may, for example, measure in a range of 2.5 mm to 6.5 mm. By way of further example, the maximum value of the separation distance 302 may measure in a range of 3.5 mm to 5.5 mm. By way of even further example, the maximum separation distance may measure in a range of 3.75 mm to 4.25 mm. By way of further example, the maximum value of the separation distance 302 may measure 3.2 mm. A minimum value of the separation distance 302 may, for example, measure in a range of 0.5 mm to 4.5 mm. By way of further example, the minimum value of the separation distance 302 may measure in a range of 1.5 mm to 3.5 mm. By way of even further example, the minimum value of the separation distance 302 may measure in a range of 1.75 mm to 2.25 mm. By way of further example, the minimum value of the separation distance 302 may measure 2 mm. In some instances, the minimum value of the separation distance 302 may measure 0 mm.

As shown in FIG. 4, each of the adjustable teeth 106 may be separable from each other in response to rotation of the spacers 110. Therefore, in some instances, each of the adjustable teeth 106 may be a separate element that slidingly engages (e.g., contacts) the non-rotatable shaft 108. A tooth biasing mechanism 402 may be provided to urge each of the adjustable teeth 106 towards an initial position (e.g., the position at which the separation distance 302 is at a minimum).

The tooth biasing mechanism 402 may include a first tooth elastic member 404 that extends between the first arm 122 and a respective one of the adjustable teeth 106 and a second tooth elastic member 406 that extends between the second arm 124 and a respective one of the adjustable teeth 106. In other words, the adjustable teeth 106 may be positioned between the first and second tooth elastic members 404 and 406. In some instances, one or more of the first and second tooth elastic members 404 and 406 may be coupled to and/or integrally formed from one or more of the adjustable teeth 106. Additionally (or alternatively), one or more of the first and second tooth elastic members 404 and 406 may be coupled to and/or integrally formed from the first and/or second arms 122 and 124, respectively.

In some instances, the first and/or second tooth elastic members 404 and 406 may be a compression spring. For example, a first plurality of compression springs may extend around the non-rotatable shaft 108 such that the adjustable teeth 106 are positioned between the first plurality of compression springs. To encourage consistent engagement between the compression springs and the adjustable teeth 106 (e.g., a uniform application of force to the adjustable teeth 106) a separation plate 405 (e.g., a washer) may be provided between each of the tooth elastic members 404 and 406 and a respective one of the adjustable teeth 106.

The separation plate 405 may engage (e.g., contact) at least a portion of one or more of the spacers 110. For example, rotation of the spacers 110 may result in the separation plates 405 transitioning from overlapping a portion of a respective spacer 110 (e.g., as generally shown in FIG. 3) to engaging (e.g., contacting) a respective spacer 110 only at the perimeter 306 (e.g., as generally shown in FIG. 4). However, such a configuration is not required. For example, the separation plate 405 may not engage (e.g., contact) the spacers 110, regardless of the rotational position of the spacers 110.

While the adjustable teeth 106 are shown as being positioned between the first and second tooth elastic members 404 and 406, such a configuration is not required. For example, an elastic member that resists the separation of the adjustable teeth 106 may be positioned between each of the adjustable teeth 106. In some instances, an elastic member positioned between the adjustable teeth 106 may be integrally formed from or coupled to each of the adjustable teeth 106 such that each of the adjustable teeth 106 may be generally described as being coupled to each other.

While the first and second tooth elastic members 404 and 406 have been generally shown and described as including one or more springs, such a configuration is not required. For example, the first and second tooth elastic members 404 and 406 may additionally (or alternatively) include any one or more of an elastomeric material that is resiliently deformable, a plurality of magnets positioned to generate a repulsive (or an attractive) force, or the like.

As also shown in FIG. 4, each of the spacers 110 may be separable from each other in response to a rotation of the rotatable shaft 112. For example, each of the spacers 110 may slidingly engage (e.g., contact) the rotatable shaft 112 such that the inter-engagement between the spacers 110 and the adjustable teeth 106 results in the sliding movement of the spacers 110 along the rotatable shaft 112. A spacer biasing mechanism 408 may be provided to urge the spacers 110 into contact with a respective one of the adjustable teeth 106.

As shown, the spacer biasing mechanism 408 may include a first spacer elastic member 410 and a second spacer elastic member 412. The first spacer elastic member 410 may extend between the first arm 122 and a respective one of the spacers 110 and the second spacer elastic member 412 may extend between the second arm 124 and a respective one of the spacers 110. In other words, the spacers 110 may be positioned between the first and second spacer elastic members 410 and 412. The first and/or second spacer elastic members 410 and 412 may be a compression spring. For example, a second plurality of compression springs may extend around the rotatable shaft 112 such that the spacers 110 are positioned between the second plurality of compression springs. In some instances, the first and/or second spacer elastic members 410 and 412 may be coupled to and/or integrally formed from one or more of the spacers. Additionally (or alternatively), one or more of the first and/or second spacer elastic members 410 and 412 may be coupled to and/or integrally formed from the first and/or second arms 122 and 124, respectively.

While the spacers 110 are shown as being positioned between the first and second spacer elastic members 410 and 412, such a configuration is not required. For example, an elastic member that resists the separation of the spacers 110 may be positioned between each of the spacers 110. In some instances, an elastic member positioned between the spacers may be integrally formed from or coupled to each of the spacers 110 such that each of the spacers 110 may be generally described as being coupled to each other. Alternatively, each of the spacers 110 may be coupled to each other without an elastic member. For example, the spacers 110 may collectively form a worm gear.

While the first and second spacer elastic members 410 and 412 have been generally shown and described as including one or more springs, such a configuration is not required. For example, the first and second spacer elastic members 410 and 412 may additionally (or alternatively) include any one or more of an elastomeric material that is resiliently deformable, a plurality of magnets positioned to generate a repulsive (or an attractive) force, or the like.

In some instances, each of the first and second teeth elastic members 404 and 406 and each of the first and second spacer elastic members 410 and 412 may be substantially the same (e.g., within manufacturing tolerances). For example, each of the first and second teeth elastic members 404 and 406 and each of the first and second spacer elastic members 410 and 412 may have the same spring constant, size, and/or shape. In other instances, one or more of the first tooth elastic member 404, the second tooth elastic member 406, the first spacer elastic member 410, and/or the second spacer elastic member 412 may be different from the others. For example, at least one of the first tooth elastic member 404, the second tooth elastic member 406, the first spacer elastic member 410, and/or the second spacer elastic member 412 may have a different spring constant, size, and/or shape from the others.

Figure 5:
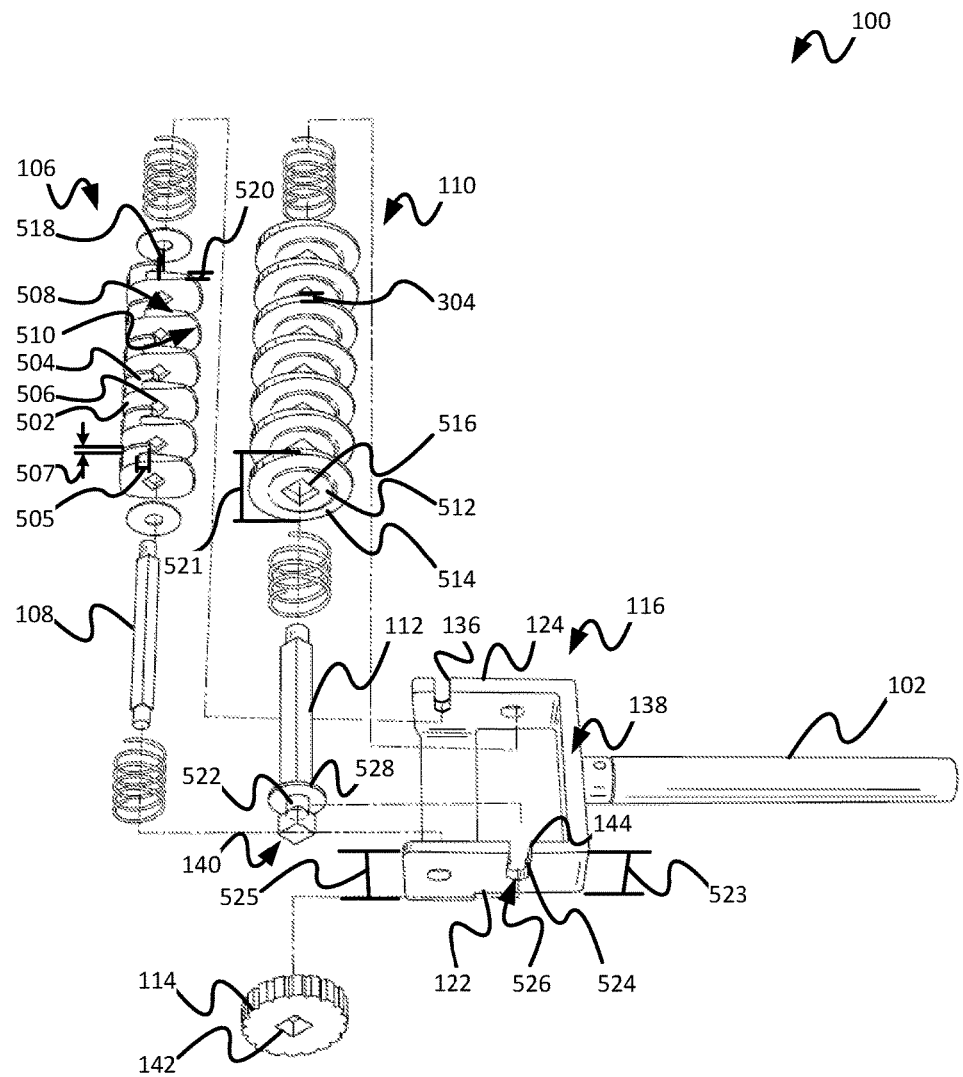
FIG. 5 is an exploded view of the adjustable brush of FIG. 1, consistent with embodiments of the present disclosure.

FIG. 5 shows an exploded view of the adjustable brush 100. As shown, the adjustable teeth 106 may be formed separately from each other. Each adjustable tooth 106 may include a body 502, a hook 504 extending from a portion of the body 502, and/or an opening 506 for receiving a portion of the non-rotatable shaft 108 that extends through the body 502. As shown, the body 502 may include a tapered region 508 extending towards an engagement end 510 of the body 502. At least a portion of the tapered region 508 may engage (e.g., contact) at least a portion of a respective one or more of the spacers 110.

The hook 504 may have a hook length 505 and a hook width 507. The hook length 505 may measure a distance sufficient to permit the hook 504 to extend from the housing 116 (e.g., beyond the bottom surface 138) and/or beyond the spacers 110. In other words, the hook length 505 may be sufficient to allow each hook 504 to engage (e.g., contact) an animal (e.g., the fur/hair of the animal and/or the skin of the animal) without the housing 116 and/or the spacers 110 interfering with the grooming of the animal. The hook width 507 may measure less than a first body thickness 518 of the body 502. In this instance, the hook 504 may extend from the body 502 such that a midpoint of the hook 504 is equidistant from opposing sides of the body 502. As a result, the minimum value of the separation distance 302 (see, e.g., FIG. 3) may measure equal to the difference between the first body thickness 518 and the hook width 507.

By way of example, the hook length 505 may measure in a range of 2 mm to 15 mm and the hook width 507 may measure in a range of 0.25 mm to 2 mm. By way of further example, the hook length 505 may measure in a range of 4.5 mm to 10 mm and the hook width 507 may measure in a range of 0.5 mm to 1.75 mm. By way of even further example, the hook length 505 may measure in a range of 6 mm to 8 mm and the hook width 507 may measure in a range of 0.75 mm to 1.25 mm. By way of further example, the hook length 505 may measure in a range of 5 mm to 7 mm and the hook width 507 may measure in a range of 0.35 mm to 0.75 mm. In some instances, the hook length 505 may, for example, measure 6 mm and the hook width 507 may, for example, measure 0.5 mm.

As shown, each of the spacers 110 may be disk-shaped and may include a raised region 512, a cam region 514 extending radially outward from the raised region 512, and/or an opening 516 for receiving a portion of the rotatable shaft 112 extending through the raised region 512 (e.g., at a central portion of the raised region 512). The thickness 304 of the spacers 110 in the cam region 514 may vary such that a rotational movement of the spacers 110 results in a lateral movement of the adjustable teeth 106 along the non-rotatable shaft 108. In other words, the thickness 304 in the cam region 514 of the spacers 110 may vary with angular and/or radial position in the cam region 514. In some instances, the spacers 110 may not include the raised region 512. In other words, the spacers 110 may include only the cam region 514 and the opening 516, wherein the opening 516 may extend through a central portion of the cam region 514.

At least a portion of the cam region 514 may engage (e.g., contact) at least a portion of the tapered region 508 of one or more adjustable teeth 106. The tapered region 508 may taper from the first body thickness 518 to a second body thickness 520, wherein the first body thickness 518 measures greater than the second body thickness 520. A measure of the difference between the first body thickness 518 and the second body thickness 520 may measure at least half of the minimum value for the thickness 304 of the spacers 110 (e.g., half of the thickness 304 at the thinnest portion of the cam region 514). As a result, one or more of the cam regions 514 positioned between the adjustable teeth 106 may not engage (e.g., contact) one or more of the adjustable teeth 106, when the portion of the cam region 514 positioned between the adjustable 106 measures equal to the minimum value for the thickness 304.

The first body thickness 518 may measure, for example, in a range of 0.5 mm to 4 mm and the second body thickness 520 may measure, for example, in a range of 0.25 mm to 3 mm. By way of further example, the first body thickness 518 may measure in a range of 1 mm to 3 mm and the second body thickness 520 may measure in a range of 0.5 mm to 2 mm. By way of even further example, the first body thickness 518 may measure in a range of 1.5 mm to 2.5 mm and the second body thickness 520 may measure in a range of 0.75 mm to 1.25 mm. By way of further example, the first body thickness 518 may measure 2.6 mm and the second body thickness 520 may measure 0.98 mm.

In some instances, the spacers 110 may have a spacer height 521 (e.g., a diameter) that measures greater than an arm height 523 and a brush head height 525, wherein the arm height 523 measures less than (or equal to) the brush head height 525. Alternatively, the spacer height 521 may measure greater than the arm height 523 and less than the brush head height 525. In another instance, the spacer height 521 may measure less than both the arm height 523 and the brush head height 525.

By way of example, the spacer height 521 may measure in a range of 10 mm to 40 mm, the arm height 523 may measure in a range of 5 mm to 35 mm, and the brush head height 525 may measure in a range of 10 mm to 35 mm. By way of further example, the spacer height 521 may measure in a range of 15 mm to 35 mm, the arm height 523 may measure in a range of 10 mm to 25 mm, and the brush head height 525 may measure in a range of 10 mm to 30 mm. By way of even further example, the spacer height 521 may measure in a range of 20 mm to 30 mm, the arm height 523 may measure in a range of 10 mm to 20 mm, and the brush head height 525 may measure in a range of 15 mm to 25 mm. By way of further example, the spacer height 521 may measure 25.6 mm, the arm height 523 may measure 17.3 mm, and the brush head height 525 may measure 20.5 mm.

As shown, the first distal end 140 of the rotatable shaft 112 may have a non-circular cross-section that generally corresponds to the non-circular cross-section of the opening 142 of the adjustment knob 114. The rotatable shaft 112 may include a cylindrical portion 522 that is capable of being received within the groove 144 of the first arm 122. The groove 144 may include one or more protrusions 524 extending outwardly from an inner surface 526 of the groove 144. The one or more protrusions 524 may rotatably retain the rotatable shaft 112 within the groove 144. As such, the one or more protrusions 524 may prevent the rotatable shaft 112 from unintentionally disengaging the first arm 122. While not shown, one or more additional protrusions may also be provided in the groove 136 in the second arm 124 to retain the non-rotatable shaft 108 within the groove 136.

As also shown, the rotatable shaft 112 may include a radial enlargement 528 adjacent (e.g., immediately adjacent) the cylindrical portion 522 of the rotatable shaft 112. The radial enlargement 528 extends radially outwardly from the rotatable shaft 112 and may slidingly engage the first arm 122. The radial enlargement 528 may have a width (e.g., a diameter) that measures greater than a width of the groove 144 in the first arm 122 such that the rotatable shaft 112 may be prevented from unintentionally disengaging the groove 144. While not shown, a radial enlargement may also extend radially outwardly from a portion of the non-rotatable shaft 108 adjacent (e.g., immediately adjacent) the second arm 124.

The non-rotatable shaft 108 and/or the rotatable shaft 112 may be formed of a plastic (e.g., acrylonitrile butadiene styrene, polycarbonate/acrylonitrile butadiene styrene, low-density polyethylene, high-density polyethylene, or the like), a metal (e.g., a stainless steel alloy, an aluminum alloy, or the like), a wood (e.g., poplar, pine, oak, or the like), and/or any other suitable material. In some instances, at least a portion of the non-rotatable shaft 108 and/or the rotatable shaft 112 may be formed of a material having low frictional properties such as nylon or polytetrafluoroethylene. The adjustable teeth 106 and/or the spacers 110 may be formed of a plastic (e.g., acrylonitrile butadiene styrene, polycarbonate/acrylonitrile butadiene styrene, low-density polyethylene, high-density polyethylene, or the like), a metal (e.g., a stainless steel alloy, an aluminum alloy, or the like), a wood (e.g., poplar, pine, oak, or the like), and/or any other suitable material. In some instances, at least a portion of the adjustable teeth 106 and/or the spacers 110 may be formed of a material having low frictional properties such as nylon or polytetrafluoroethylene. The housing 116 may be formed of a plastic (e.g., acrylonitrile butadiene styrene, polycarbonate/acrylonitrile butadiene styrene, low-density polyethylene, high-density polyethylene, or the like), a metal (e.g., a stainless steel alloy, an aluminum alloy, or the like), a wood (e.g., poplar, pine, oak, or the like), and/or any other suitable material. In some instances, at least a portion of the housing 116 may be formed of a material having low frictional properties such as nylon or polytetrafluoroethylene. The handle 102 may be formed of a plastic (e.g., acrylonitrile butadiene styrene, polycarbonate/acrylonitrile butadiene styrene, low-density polyethylene, high-density polyethylene, or the like), a metal (e.g., a stainless steel alloy, an aluminum alloy, or the like), a wood (e.g., poplar, pine, oak, or the like), a thermoplastic rubber, and/or any other suitable material. In some instances, at least a portion of the handle 102 may include a high friction material (e.g., rubber, silicone, or the like) to facilitate a better grip.

For example, the adjustable teeth 106 may be formed of a metal (such as a stainless steel alloy), the spacers 110 may be formed of a low friction material (such as nylon or polytetrafluoroethylene), both the non-rotatable shaft 108 and the rotatable shaft 112 may be formed of a low friction material (such as nylon or polytetrafluoroethylene), the housing 116 may be formed of a plastic (such as acrylonitrile butadiene styrene or high-density polyethylene), and the handle 102 may be formed of a plastic (such as acrylonitrile butadiene styrene or high-density polyethylene).

By way of further example, the adjustable teeth 106, the spacers 110, the non-rotatable shaft 108, the rotatable shaft 112, and the housing 116 may each be formed a stainless steel alloy and the handle 102 may be formed of a thermoplastic rubber. In some instances the handle 102 may comprise multiple materials such that, for example, the handle 102 has multiple (e.g., at least two) colors and/or multiple (e.g., at least two) hardness values (e.g., as may be measured according to the Rockwell hardness test).

While the figures (see, e.g., FIG. 4) generally illustrate the adjustable teeth 106 and the spacers 110 extending along only a portion of the non-rotatable shaft 108 and the rotatable shaft 112 (e.g., when the separation distance 302 is maximized), respectively, such a configuration is non-limiting. For example, when the separation distance 302 is maximized the adjustable teeth 106 and/or the spacers 110 may extend along a substantial portion (e.g., at least 85%, at least 90%, at least 95%, or at least 99%) of the non-rotatable shaft 108 and/or the rotatable shaft 112, respectively.

While particular embodiments of the present disclosure have been illustrated and described, it would be obvious to those skilled in the art that various other changes and modifications can be made without departing from the spirit and scope of the disclosure. It is therefore intended to cover in the appended claims all such changes and modifications that are within the scope of this disclosure.

What is claimed is:

1. An adjustable brush comprising:
   a handle; and
   a brush head coupled to the handle, wherein the brush head includes:
      a platform;
      a first arm extending from the platform;
      a second arm extending from the platform;
      a non-rotatable shaft extending between the first and second arms;
      a rotatable shaft positioned between the non-rotatable shaft and the platform, the rotatable shaft extending between the first and second arms;
      a plurality of adjustable teeth slideably coupled to the non-rotatable shaft; and
   a plurality of spacers positioned on the rotatable shaft, at least a portion of one or more of the plurality of spacers engages at least a portion of a respective one or more of the adjustable teeth, wherein rotation of the rotatable shaft causes rotation of the spacers and a lateral movement of the adjustable teeth along the non-rotatable shaft.

2. The adjustable brush of claim 1 further comprising a support extending from the first arm to the second arm.

3. The adjustable brush of claim 2, wherein the support extends longitudinally between distal ends of the first and second arms and at least a portion of the spacers such that the support covers at least a portion of the adjustable teeth.

4. The adjustable brush of claim 3, wherein at least a portion of the spacers extends beyond a top surface of the support.

5. The adjustable brush of claim 1 further comprising a first plurality of compression springs, wherein the plurality of adjustable teeth are positioned between the first plurality of compression springs.

6. The adjustable brush of claim 5 further comprising a second plurality of compression springs, wherein the plurality of spacers are positioned between the second plurality of compression springs.

7. The adjustable brush of claim 1, wherein each of the spacers are disk-shaped and include a cam region.

8. The adjustable brush of claim 1, wherein each of the adjustable teeth include a tapered region and, wherein, at least a portion of the tapered region engages at least a portion of a respective one or more spacers.

9. A brush head comprising:
   a platform;
   a first arm extending from the platform;
   a second arm extending from the platform;
   a non-rotatable shaft extending between the first and second arms;
   a rotatable shaft positioned between the non-rotatable shaft and the platform, the rotatable shaft extending between the first and second arms;
   a plurality of adjustable teeth slideably coupled to the non-rotatable shaft; and
   a plurality of spacers positioned on the rotatable shaft, at least a portion of one or more of the plurality of spacers engages at least a portion of a respective one or more of the adjustable teeth, wherein rotation of the rotatable shaft causes rotation of the spacers and a lateral movement of the adjustable teeth along the non-rotatable shaft.

10. The brush head of claim 9 further comprising a support extending from the first arm to the second arm.

11. The brush head of claim 10, wherein the support extends longitudinally between distal ends of the first and second arms and at least a portion of the spacers such that the support covers at least a portion of the adjustable teeth.

12. The brush head of claim 11, wherein at least a portion of the spacers extends beyond a top surface of the support.

13. The brush head of claim 9 further comprising a first plurality of compression springs, wherein the plurality of adjustable teeth are positioned between the first plurality of compression springs.

14. The brush head of claim 13 further comprising a second plurality of compression springs, wherein the plurality of spacers are positioned between the second plurality of compression springs.

15. The brush head of claim 9, wherein each of the spacers are disk-shaped and include a cam region.

16. The brush head of claim 9, wherein each of the adjustable teeth include a tapered region and, wherein, at least a portion of the tapered region engages at least a portion of a respective one or more spacers.

17. A brush head comprising:
   a housing having a first arm and a second arm, wherein a non-rotatable shaft and a rotatable shaft extend between the first and second arms;

a plurality of adjustable teeth slideably coupled to the non-rotatable shaft; and a plurality of spacers positioned on the rotatable shaft, at least a portion of one or more of the plurality of spacers engages at least a portion of a respective one or more of the adjustable teeth, wherein rotation of the rotatable shaft causes rotation of the spacers and a lateral movement of the adjustable teeth along the non-rotatable shaft.

18. The brush head of claim 17 further comprising a support extending from the first arm to the second arm.

19. The brush head of claim 18, wherein the support extends longitudinally between distal ends of the first and second arms and at least a portion of the spacers such that the support covers at least a portion of the adjustable teeth.

20. The brush head of claim 19, wherein the spacers extend beyond a top surface of the housing and remain below a top surface the support.

\* \* \* \* \*